United States Patent [19]
Tsuchiya et al.

[11] 3,828,872
[45] Aug. 13, 1974

[54] VEHICLE FOR USE ON SNOW, ICE OR THE LIKE

[75] Inventors: Toshio Tsuchiya, Ooi; Atsushi Abe, Asaka, both of Japan

[73] Assignee: Honda Giken Kogyo Kabushiki Kaisha, Tokyo, Japan

[22] Filed: Mar. 7, 1973

[21] Appl. No.: 339,006

[30] Foreign Application Priority Data
Mar. 8, 1972 Japan.............................. 47-23741

[52] U.S. Cl. .............................. 180/5 R, 280/21 R
[51] Int. Cl. ........................................ B62m 27/00
[58] Field of Search ................... 180/5 R; 280/21 R

[56] References Cited
UNITED STATES PATENTS

| | | | |
|---|---|---|---|
| 3,575,249 | 4/1971 | Raistkka | 180/5 R |
| 3,578,095 | 5/1971 | Hauser | 180/5 R |
| 3,712,396 | 1/1973 | Ende | 180/5 R |
| 3,757,880 | 9/1973 | Jones | 180/5 R |

FOREIGN PATENTS OR APPLICATIONS

| | | | |
|---|---|---|---|
| 446,088 | 3/1968 | Switzerland | 305/35 EB |

*Primary Examiner*—Richard J. Johnson
*Attorney, Agent, or Firm*—Eric H. Waters

[57] ABSTRACT

A pleasure vehicle comprised of a sleighed, front riding portion and an endless tracked rear drive portion and steerable by the rider's bodily movement to shift his own weight right and left relative to his seat. It is particularly attractive to the rider for the driving technique required. Also, it can run with a substantial stability irrespective of the irregularities of the snow, ice or the like surface.

1 Claim, 10 Drawing Figures

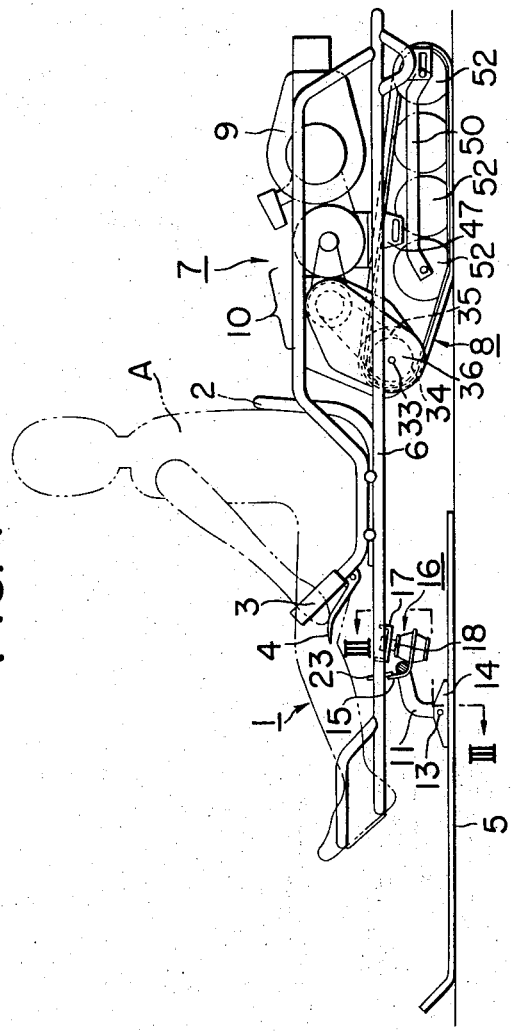
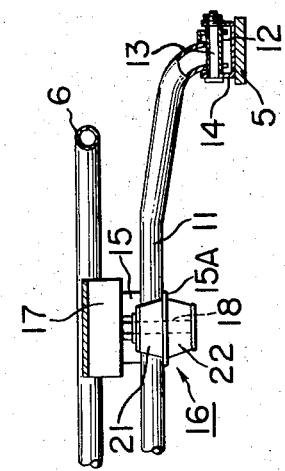
FIG. 1
FIG. 3

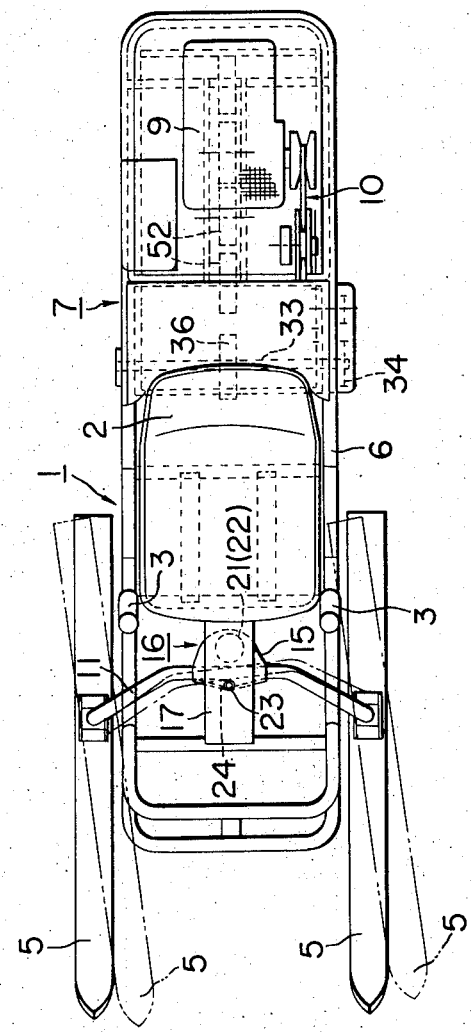

3,828,872

VEHICLE FOR USE ON SNOW, ICE OR THE LIKE

BACKGROUND AND SUMMARY OF THE INVENTION

This invention relates generally to vehicles for use on snow, ice or the like and more particularly to those for pleasure use of the general type including a sleighed, front riding portion and an endless tracked, rear drive portion.

In the past, vehicles of the general type described have been known which include a riding portion having a pair of right and left sleigh plates arranged at the bottom thereof and provided with handle or other steering means operable to turn the sleigh plates in either direction.

The present invention is intended to realize a pleasure vehicle of the general type described which is peculiarly attractive to the rider for the driving technique required.

Accordingly, the primary object of the present invention is to provide a vehicle of the general type described which is so constructed as to be steered by the rider's bodily movement to shift his own weight sidewise relative to his seat without use of any steering handle or other like means previously employed.

Further object of the present invention is to provide a vehicle of the character described which has a construction designed to enable the vehicle to run with an improved lateral stability irrespective of whether the course it takes is straight or curved.

According to the present invention, there is provided a vehicle for use on snow, ice or the like which comprises a riding portion having a sleigh assembly including a pair of right and left sleigh plates arranged at the bottom of said riding portion and a drive portion connected to the rear of said riding portion and provided with an endless track and a power unit for driving said endless track, said sleigh assembly being connected to the frame structure of said riding portion through a joint mechanism enabling said sleigh assembly to turn right and left relative to the frame structure with the rider's bodily movement shifting his own weight sidewise relative to his seat on the frame structure.

According further to the present invention, the drive portion of the vehicle has a series of drive and guide wheels arranged medially thereof in longitudinally aligned relation with each other for engagement with the endless track, which has a largely extended width and is medially held in engagement with said drive and guide wheels, the opposite side portions of said endless track being flexible relative to the medial portion thereof and serving to support a substantial part of the weight of the vehicle.

These and other objects, features and advantages of the present invention will become apparent from the following description when taken in conjunction with the accompanying drawings.

BRIEF DESCRIPTION OF THE DRAWINGS

The accompanying drawings illustrate one preferred embodiment of the invention and in which drawings:

FIG. 1 is a side elevational view of a vehicle embodying the present invention;

FIG. 2 is a plan view of same;

FIG. 3 is a fragmentary cross-sectional view substantially taken along the line III—III in FIG. 1;

DESCRIPTION OF THE PREFERRED EMBODIMENT

Figure 4:
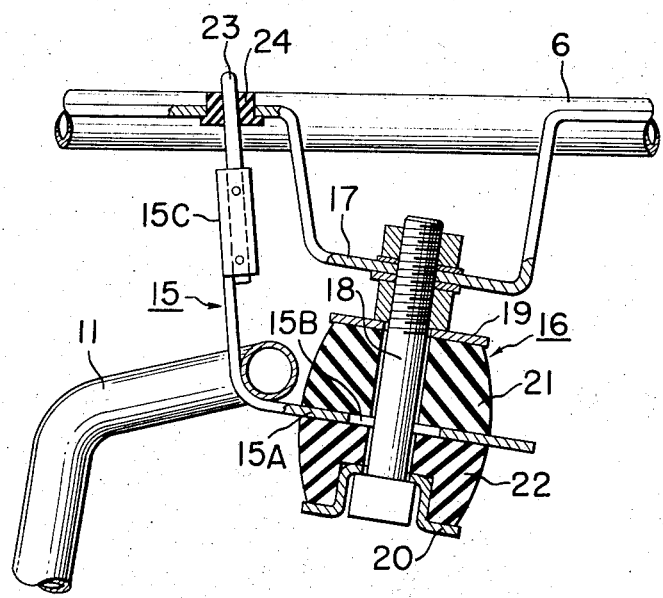
FIG. 4 is an enlarged fragmentary cross-sectional view of the joint mechanism shown in FIG. 1.

Referring to the drawings and first to FIGS. 1 to 3, reference numeral 1 generally indicates the riding portion of the vehicle illustrated, including at the top a rider's seat 2 a pair of right and left hand grip bars 3 enabling the rider to keep himself from being thrown off the riding portion 1 during drive of the vehicle, and a throttle lever 4 provided for controlling an engine 9, which is mounted on the drive portion of the vehicle, as will be described below. At the bottom of the riding portion 1, a sleigh assembly including a pair of right and left sleigh plates 5 is arranged in a manner described hereinafter. Reference numeral 7 generally indicates the drive portion of the vehicle, which extends rearwardly from the riding portion 1. As shown, the riding and drive portions 1 and 7 of the vehicle are integrally connected with each other by means of a horizontal frame 6 of the vehicle. The drive portion 7 includes an endless track, i.e., an endless, self-laid track arranged on the underside thereof and having a largely extended width and a power unit mounted on the top and including an engine 9 and a speed reduction mechanism 10.

Figure 5:
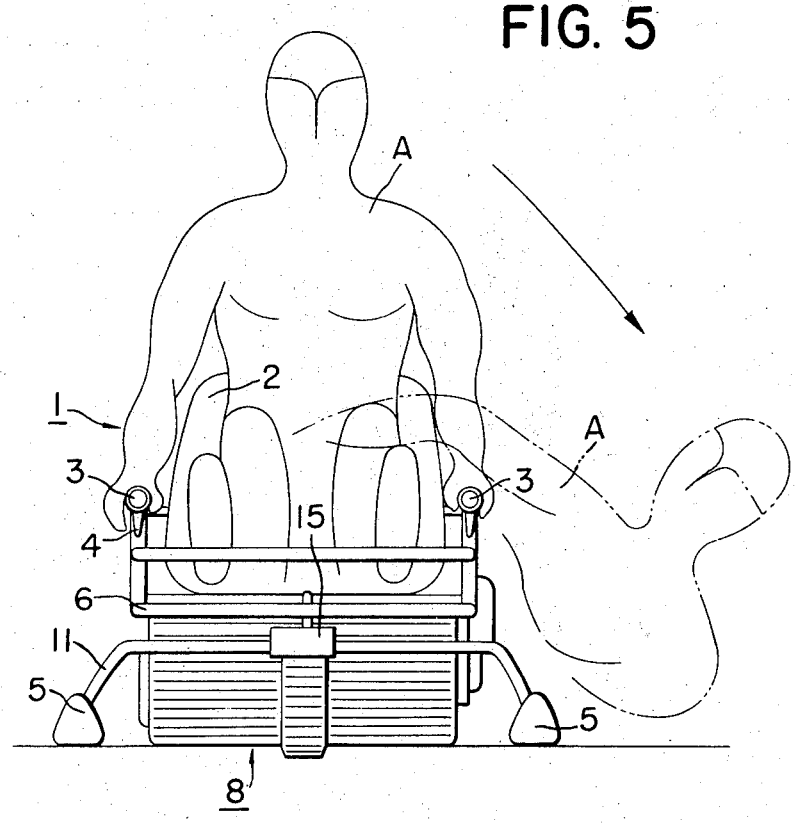
FIG. 5 is an enlarged front elevation of the vehicle shown in FIGS. 1 and 2.

The sleigh assembly includes a generally transversely extending link 11 which connects the right and left sleigh plates 5 with each other. To this end, the connecting link 11 has a pair of aligned bearing sleeves 12 (FIG. 3) fixed to the opposite ends thereof and in which respective pivot pins 13 are pivotally fitted. As shown, the sleeves 12 and pivot pins 13 extend substantially horizontally and at right angles to the direction of travel of the vehicle. Each of the sleigh plates 5 has a bracket piece 14 fixed to the top side thereof to pivotally support the respective horizontal pivot pins 13. A bracket plate 15 is fixed to the connecting link 11 at the middle thereof and is connected with the vehicle frame 6 through the intermediary of a steering joint mechanism 16, which allows the sleigh assembly, including sleigh plates 5 and connecting link 11, to turn to the right or left relative to the vehicle frame 6, as illustrated in FIG. 2 by chain-dotted lines, when the rider A shifts his weight to the right or left relative to the riding portion 1, as illustrated in FIG. 5 by chain-dotted lines, thus enabling the rider to steer the vehicle at his own will.

Various forms of joint mechanism serving basically the same function have previously been known, for example, in the art of roller skates and are utilizable in designing the steering joint mechanism 16. One preferred form of such joint mechanism 16 will next be described with reference to FIGS. 2, 3 and 4.

Reference numeral 17 indicates a bracket plate secured to the horizontal frame 6 of the vehicle and to which a slightly forwardly inclined shaft 18 having an enlarged bottom is fixed at the top thereof. Fitted over the inclined shaft 18 are washer plates 19 and 20 and elastic rings 21 and 22 interposed therebetween. Clamped between the elastic rings 21 and 22 is a portion 15A of the bracket plate 15 extending rearwardly from the connecting link 11. As seen in FIG. 4, the portion 15A of the bracket plate 15 is formed with an aperture 15B to loosely receive the inclined shaft 18. Fixed to the remaining portion 15C of the bracket plate 15 extending vertically upward from the connecting link 11 is a support rod 23 slidably fitted through an apertured elastic bushing 24, which in turn is fitted in the bracket plate 17 secured to the frame 6. With this arrangement, it will readily be recognized that, when the rider A shifts his own weight to the right or left relative to his seat, the elastic rings 21 and 22 are compressed unevenly between the right and left sides thereof, causing the bracket plate 15 and the connecting link 11 to rock sidewise with the aid of the support rod 23 fitted in the elastic bushing 24, and accordingly the sleigh plates 5 are turned to the right or left.

In this manner, the rider on the vehicle of the present invention can freely steer the vehicle just by shifting his own weight sidewise to turn the sleigh assembly, which is mounted on the riding portion 1 of the vehicle, connected with the endless tracked rear drive portion 7 to be driven forward thereby. The rider's bodily movements in steering such vehicle should be very bold and dynamic as compared with the controlling motion previously required with a vehicle having sleigh-steering handle means. This apparently makes the vehicle of the invention very attractive to the rider for the driving technique required and the drive of such vehicle will arouse keen interest on the side of spectators. Incidentally, it will readily be understood that, as an alternative design, the rear drive portion 7 of the vehicle may be flexibly connected with the front riding portion 1 by means of a universal joint, a shaft coupling or the like, instead of the rigid connection between the riding and drive portions of the vehicle illustrated employing a horizontal unitary frame 6.

Description will next be made of the arrangement designed to make the vehicle illustrated and constructed as described hereinbefore particularly stable during its travel irrespective of whether the course it takes is straight or curved with reference to FIGS. 6 to 10.

Figure 7:
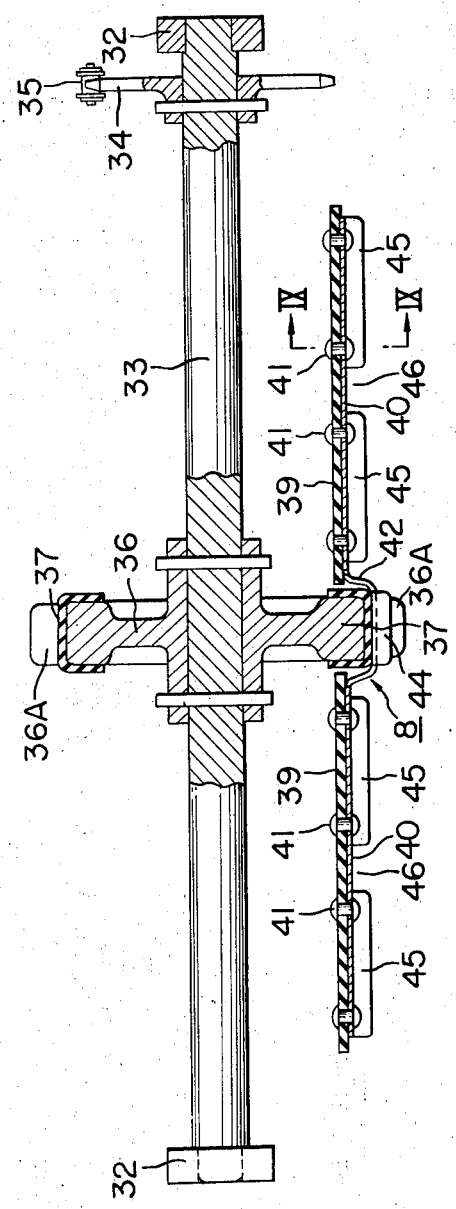
FIG. 7 is a cross-sectional view taken along the line VII—VII in FIG. 6.

As shown in FIG. 7, in the rear drive portion 7 of the vehicle, the horizontal frame 6 has bracket pieces 32 fixed to the opposite sides thereof to support therebetween a drive shaft 33 transversely of the vehicle. A chain sprocket wheel 34 is fixedly mounted on the drive shaft 33 and is held in engagement with a chain belt 35 which is driven from the speed reduction unit 10. A drive wheel 36 is fixedly mounted on the drive shaft 33 midway of its length and is formed about its periphery with driving teeth 36A with cushioning plates 37 arranged in the spacings therebetween.

The endless track 8 of substantially extended width is principally composed of a pair of right and left annular belts 39 made of rubber or the like material and arranged parallel to each other on the opposite sides of the drive wheel 36 and a multitude of connecting bars 40 extending transversely of the track to interconnect the right and left annular belts 39. The connecting bars 40 are made of steel plate or other highly flexible material are secured to the outer peripheral surface of the annular belts 39 by rivet means 41. Also, the connecting bars 40 are each medially bent outwardly to form a U-shaped portion 42 and the driving teeth 36A of drive wheel 36 are received in the spacings 43 (FIG. 6) between the U-shaped medial portions 42 of the connecting bars 40. The front and rear edges of the U-shaped medial portion 42 of each connecting bar 40 are bent outwardly to form scraper blades 44. Reference numeral 45 indicates further scraper blades formed on each connecting bar 40 along the rear edge of those portions thereof which are laid on the respective annular belts 39. As indicated at 46 in FIG. 7, the scraper blades 45 are appropriately spaced apart from each other lengthwise of the connecting bar 40, allowing the connecting bar and the annular belts to flex as illustrated in FIG. 8.

Figure 6:
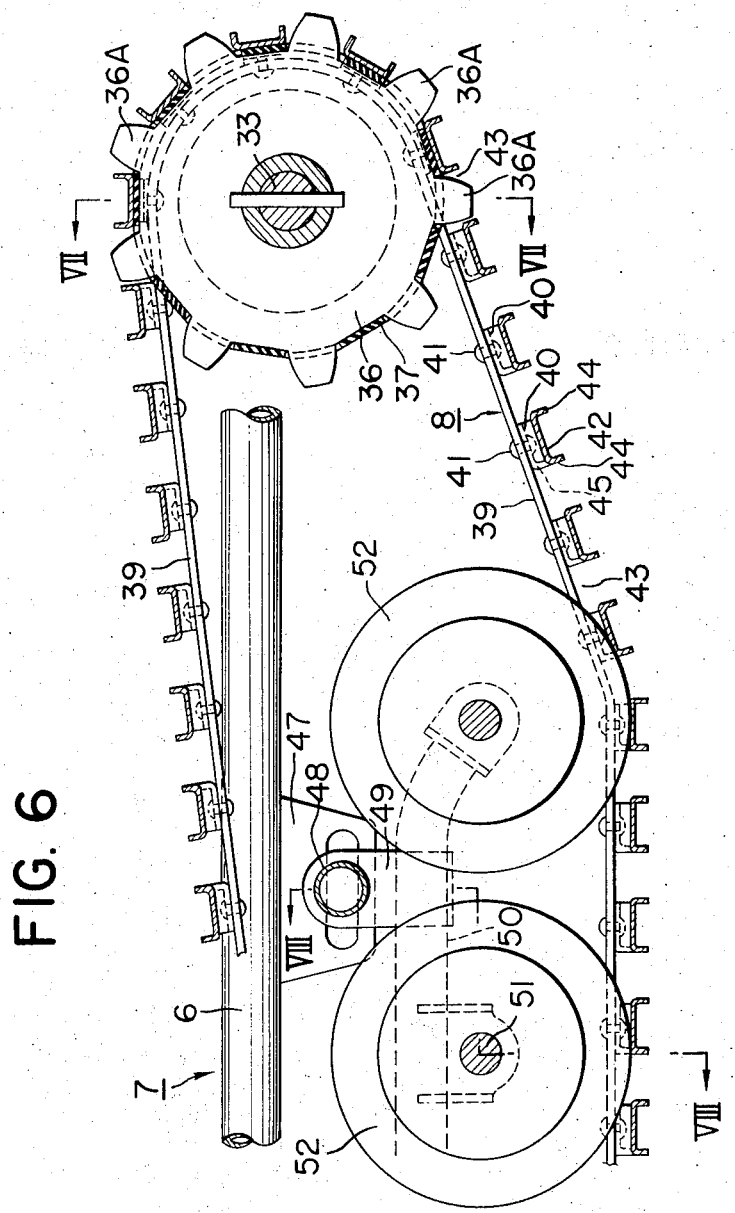
FIG. 6 is an enlarged fragmentary cross-sectional side view of the front portion of the drive section of the vehicle, as seen from the right-hand side thereof.
Figure 8:
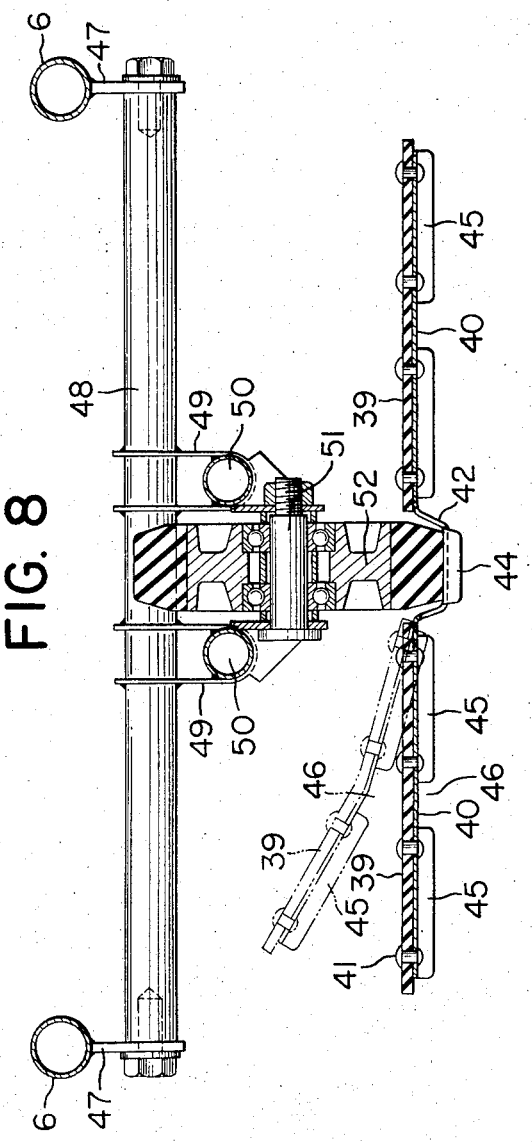
FIG. 8 is a cross-sectional view taken along the line VIII–VIII in FIG. 6.

Referring to FIGS. 6 and 8, bracket plates 47 are secured to the horizontal frame 6 of the vehicle on the opposite sides thereof to support a transverse shaft 48, which is fixed to the bracket plates 47 at the opposite ends. Supporting rods 50 are fixed to the transverse shaft 48 midway thereof by means of respective connecting members 49 jointly to support an axle shaft 51, on which a guide wheel 52 is rotatably mounted for peripheral engagement with the U-shaped medial portions 42 of the connecting bars 40.

The drive portion 7 of the construction described above is integrally connected with the riding portion 1 on the rear side thereof and, as the endless track 8 is rotated by the engine 9 mounted on the drive portion 7, the medial portion of the track including U-shaped portions 42 of the connecting bars 40 and the scraper blades 44 formed thereon is pressed into the snow or ice surface on which the track 8 is laid to effectively prevent the latter from slipping sidewise. At the same time, the side or wing portions of the endless track 8 including scraper blades 45 are brought into pressure engagement with the snow or ice surface efficiently to drive forward the vehicle including the front riding portion 1 and the endless tracked rear drive portion 7. During the drive, the drive portion 7 of the vehicle can proceed with a minimum of rolling or lateral rocking movement just like a motorcycle or the like two-wheel vehicle irrespective of the irregularities of the surface regions extending on the opposite sides of the medial portion of the endless track 8 since the side portions thereof including annular belts 39 can flex up and down together with the connecting bars 40 according to the surface irregularities. Further, the flexible track portions, pressure-engaging the surface over which the vehicle proceeds, serve to sustain any sidewise tilt of the vehicle by co-operating resiliently to bear a substantial part of the weight of the vehicle so that the vehicle can proceed as a whole with a substantial stability.

On the other hand, when the rider A on the front riding portion 1 of the vehicle shifts his weight to the right or left relative to his seat for the purpose of changing the direction of travel of the vehicle, the rear drive portion 7 of the vehicle will readily be tilted sidewise in the steering direction together with the riding portion 1 owing to the fact that the side portions of the endless track 8 are flexible relative to the medial portion thereof, which is in engagement with the ground surface along a straight line. As will be appreciated, such tilting movement of the drive portion 7 of the vehicle facilitates the turning movement of the sleigh assembly including sleigh plates 5 and enables the vehicle to take any curved course with substantial stability. In this connection, it is to be noted that the drive portion 7 of the vehicle may be connected with the riding portion 1 thereof by appropriate horizontal shaft means allowing vertical pivotal movement of the drive portion 7 relative to the riding portion 1 of the vehicle without employing any means rigidly interconnecting the vehicle portions, for example, in the form of horizontal frame 6 in the illustrated embodiment since the drive portion 7 is required only to tilt together with the riding portion 1.

Figure 10:
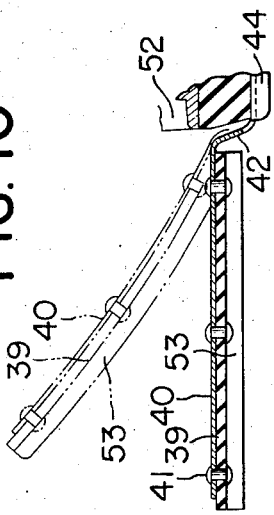
FIG. 10 is a view similar to FIG. 8, illustrating a modified form of the side wing portions of the endless track.
Figure 9:
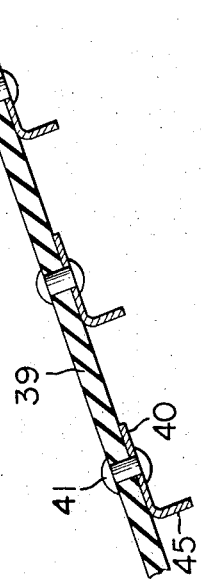
FIG. 9 is an enlarged cross-sectional view taken along the line IX—IX in FIG. 7.

FIG. 10 illustrates a modification of the endless track 8 and more particularly of the side portions thereof. In this modification, each of the connecting bars 10 is secured to the inside of the annular belts 39 by rivet means 41 and is formed with scraper blades 53 extending along the whole width of the annular belts 39 and projecting outwardly beyond the outer surface thereof instead of the shorter spaced scraper blades 45 formed in the embodiment described hereinbefore. The connecting bars 40 may be covered with rubber or the like material, if desired.

It will be apparent to those skilled in the art that the invention is not restricted to the features described above and shown in the drawings but may be varied in many ways within the scope of the appendant claim.

What is claimed is:

1. A vehicle for use on snow, ice or the like, comprising a riding portion having a sleigh assembly including a pair of sleigh plates arranged at the bottom thereof and a drive portion carrying an endless track and a power unit therefor and connected with said riding portion in a manner so as to be able to tilt sidewise with said riding portion, said sleigh assembly being connected with the frame of said riding portion through the medium of a joint mechanism causing said sleigh assembly to be turned right and left relative to the frame of said riding portion as the rider thereon shifts his own body weight right and left, said drive portion of the vehicle having drive and guide wheels arranged medially thereof in longitudinally aligned relation with each other, said endless track having a largely extended width and medially held in engagement with said drive and guide wheels, the opposite side portions of said endless track being made flexible relative to the medial portion thereof and serving to support a substantial part of the weight of the vehicle.

* * * * *